United States Patent
Nagashima et al.

(10) Patent No.: US 8,118,583 B2
(45) Date of Patent: Feb. 21, 2012

(54) MOLDING CONSTRUCTION AND A MOLDING METHOD FOR A RESIN-MOLDED PRODUCT

(75) Inventors: Shinyu Nagashima, Yokkaichi (JP); Akihito Maegawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 195 days.

(21) Appl. No.: 11/652,445

(22) Filed: Jan. 11, 2007

(65) Prior Publication Data

US 2007/0164475 A1    Jul. 19, 2007

(30) Foreign Application Priority Data

Jan. 18, 2006  (JP) ................................ 2006-010433

(51) Int. Cl.
*B29C 45/14* (2006.01)

(52) U.S. Cl. ........ 425/330; 425/414; 425/466; 425/467; 264/259; 264/271.1; 264/272.11; 264/272.15; 264/279

(58) Field of Classification Search ............... 264/259, 264/271.1, 272, 272.11, 272.15, 279; 425/330, 425/414, 466, 467
See application file for complete search history.

(56) References Cited

U.S. PATENT DOCUMENTS

| | | | |
|---|---|---|---|
| 5,164,144 A | | 11/1992 | Rose |
| 5,926,952 A | * | 7/1999 | Ito .................................. 29/883 |
| 6,045,739 A | * | 4/2000 | Abe ............................... 264/277 |
| 6,527,989 B1 | * | 3/2003 | Onoda ........................ 264/40.1 |
| 6,780,067 B1 | * | 8/2004 | Kono et al. ............. 264/272.17 |
| 2004/0142597 A1 | | 7/2004 | Mizutani |
| 2005/0247151 A1 | * | 11/2005 | Yamamoto et al. ............. 74/425 |
| 2006/0019515 A1 | | 1/2006 | Takagi |
| 2006/0019516 A1 | * | 1/2006 | Nagashima et al. ............ 439/79 |

FOREIGN PATENT DOCUMENTS

| | | |
|---|---|---|
| GB | 2 424 613 | 10/2006 |
| JP | 8-155963 | 6/1996 |
| JP | 8-169028 | 7/1996 |
| JP | 9-270353 | 10/1997 |
| JP | 2000-159084 | 6/2000 |
| JP | 2005-174697 | 6/2005 |
| JP | 2006032218 A * | 2/2006 |

* cited by examiner

*Primary Examiner* — Joseph Del Sole
*Assistant Examiner* — Timothy Kennedy
(74) *Attorney, Agent, or Firm* — Gerald E. Hespos; Michael J. Porco

(57) ABSTRACT

A connector (20) is placed in a first die (50) so that an end of a wall (41) of the connector (20) closely contacts a recess (55) of the first die (50) to define a cutoff (58). The dies then are closed to define a filling space (60C) between a surface (62) of a second die (51) and an outer surface (46) of the wall (41). The outer surface (46) of the wall (41) is inclined moderately upward. Molten resin is directed into the filling space (60C) and presses the inclined outer surface (46) of the wall (41) so that an inner surface (47) of the bottom wall (41) is pressed against the recess (55) of the first die (50) and strongly held in close contact by a component of this pressing force. Thus, molten resin cannot intrude through the cutoff (58).

11 Claims, 7 Drawing Sheets

MOLDING CONSTRUCTION AND A MOLDING METHOD FOR A RESIN-MOLDED PRODUCT

BACKGROUND OF THE INVENTION

1. Field of the Invention

The invention relates to a molding construction and to a molding method for a resin-molded product formed by insert molding using a primary molded product as an insert.

2. Description of the Related Art

An electronic control unit (ECU) has electronic control circuits and various electronic components mounted on a printed circuit board that is disposed in a casing made of synthetic resin. Japanese Unexamined Patent Publication No. 2000-159084 and FIG. 7 herein show examples of an ECU. The ECU shown in FIG. 7 has a box-shaped casing 1 with an open top. It should be noted that FIG. 7 shows the molding of the casing 1 and depicts the casing 1 in an inverted orientation. A circuit board 2 is disposed in the casing 1 and a circuit board connector 3 is arranged at a side wall for connection with an external mating connector. Terminal fittings 4 are mounted in the connector 3 and extend through a terminal draw out part 5 of the connector 3 for connection with the circuit board 2

The casing 1 is formed by insert molding with the circuit board connector 3 as an insert. The molding is carried out using upper and lower molding dies uk, dk that can open and close relative to each other. The circuit-board connector 3 has a bottom wall 6a and side walls 6b that cooperate with the molding dies uk, dk to prevent resin from flowing into the draw-out part 5.

The circuit board connector 3 is placed in the lower die dk. As a result, the rear side and the upper side (lower side in FIG. 7) of the terminal draw-out part 5 of the circuit-board connector 3 are closed by the lower die dk. A stepped recess 7 is formed at the highest part of the lower die dk and the bottom wall 6a of the connector 3 is nested in close contact with a corner of the recess 7. A filling space 8 is defined between the upper die uk and both the bottom wall 6a of the connector 3 and part of the lower die dk when the dies uk, dk are closed. Molten resin flows into the filling space 8, as shown by arrows in FIG. 7, and solidifies to form a bottom plate 1a of the casing 1.

The rear end of the bottom wall 6a of the connector 3 is placed closely in the corner of the recess 7 of the lower die dk to define a cutoff portion at the bottom plate 1a of the casing 1. The molten resin may flow from the filling space 8 into the cutoff portion, and may leak into the terminal draw-out part 5 of the connector 3 if the cutoff portion is not held securely in close contact.

The present invention was developed in view of the above problem and an object thereof is to prevent the leakage of resin from a cutoff portion.

SUMMARY OF THE INVENTION

The invention relates to a molding construction for a resin-molded product. The construction has first and second molding dies that can open and close relative to each other. At least one recess is formed in a facing surface of the first molding die to define a step. At least one insert is placed in the first molding die and is held in close contact with a corner of the recess. A facing surface of the second molding die is in spaced facing relationship to a side surface of the insert, thereby defining a filling space when the molding dies are closed. Molten resin flows along a flowing path into the filling space from a side where the corner of the recess is located and solidifies to form a molded product. A cross-sectional area of the filling space gradually is reduced along the flowing path of the molten resin into the filling space.

The molten resin flows into the filling space when the molding dies are closed. The molten resin generates a pressing force due to the reduction in cross-sectional area and a component of the pressing force presses the insert against the recess of the second molding die. Thus the insert and the recess are held strongly in close contact to prevent both the intrusion of molten resin and the leakage of molten resin from the cutoff portion.

A primary molded product preferably is the insert and is placed in the first molding die. A secondary molded product then is molded by flowing resin into the filling space.

One side surface and one end surface of the insert preferably are held in close contact with the corner of the recess. The side surface of insert facing the filling space is formed into an inclined surface that gradually narrows the width of the filling space along a flowing path of the molten resin.

The invention also is applicable in the case where a casing is formed by insert molding, using a connector having terminal fitting mounted therein as an insert, and the connector is embedded in the formed casing. Thus, the casing can be formed without causing the leakage of resin.

The invention also relates to a molding method for molding a resin-molded product. The method comprises providing at least one pair of molding dies openable and closable relative to each other, providing at least one recess in a first molding die, placing at least one insert in the first molding die so that the insert is held in close contact with a corner of the recess, defining a filling space upon closing the molding dies by means of a facing surface of the second molding die arranged to substantially face a side surface of the insert while being spaced apart therefrom, flowing molten resin along a flowing path into the filling space from a side where the corner of the recess is located, thereby generating a pressing force component by means of the molten resin to press the insert against the recessed surface of the second molding die, and solidifying the resin to form a molded product.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

One preferred embodiment of the invention is described with reference to FIGS. 1 to 6. In this embodiment, the invention is applied to an ECU 10 (electronic control unit) to be installed in an automotive vehicle.

Figure 1:
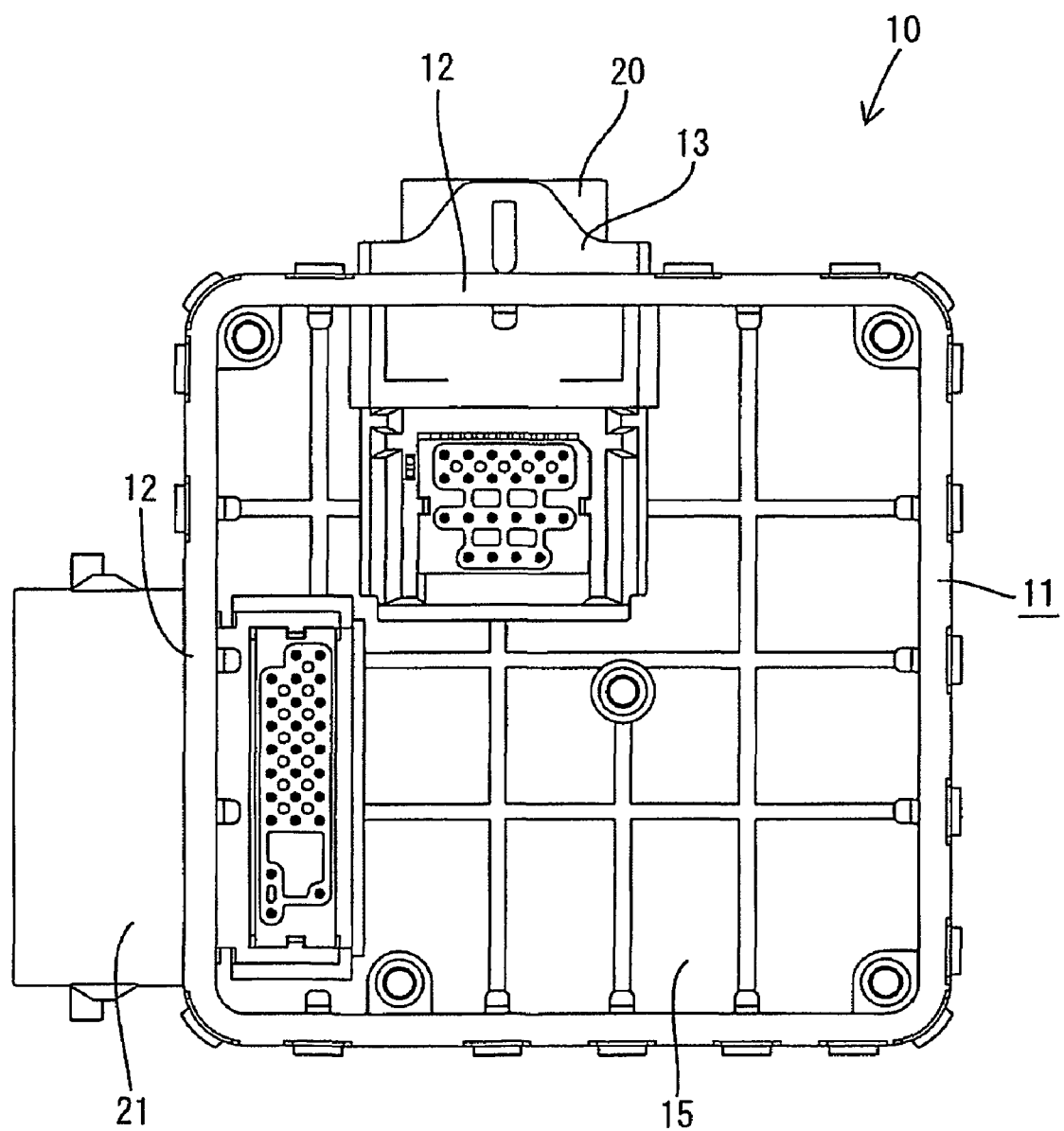
FIG. 1 is a plan view of an ECU without a lid according to one embodiment of the invention.
Figure 2:
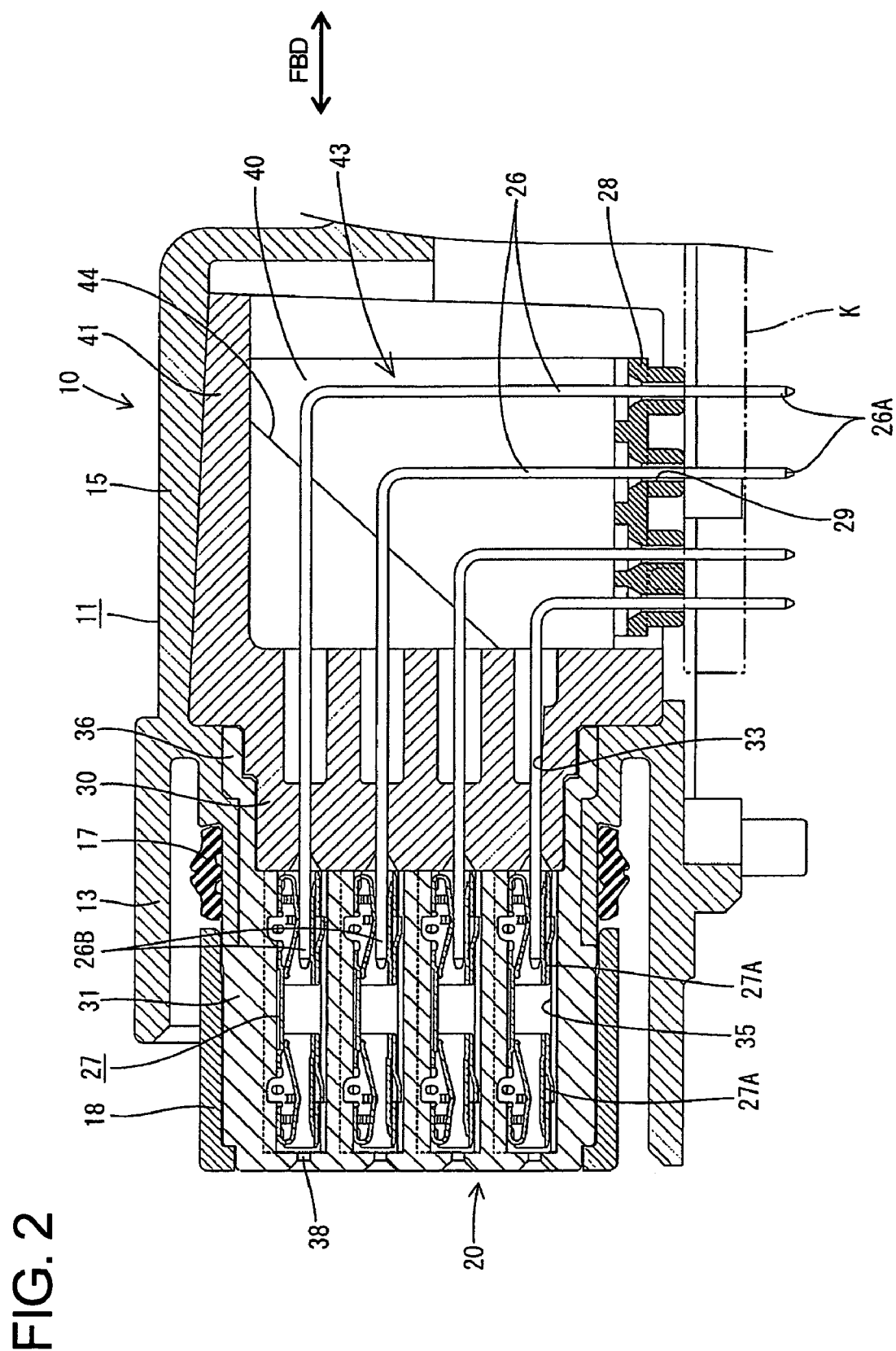
FIG. 2 is a section of a connector embedded part of the ECU.

As shown in FIGS. 1 and 2, the ECU 10 has a shallow substantially box-shaped casing 11 made e.g. of synthetic resin and having an open top. Circuit board connectors 20, 21 are provided on two adjacent side walls 12 of this casing 11, and mating male connectors (not shown) are to be connected with the respective connectors 20, 21 from the outside. The casing 11 is formed by insert molding using both circuit board connectors 20, 21 as inserts.

The following description of a molding construction is centered on an embedded part of one connector 20. It should be noted that the ECU 10 is in an inverted orientation in FIGS. 2 to 6.

Figure 3:
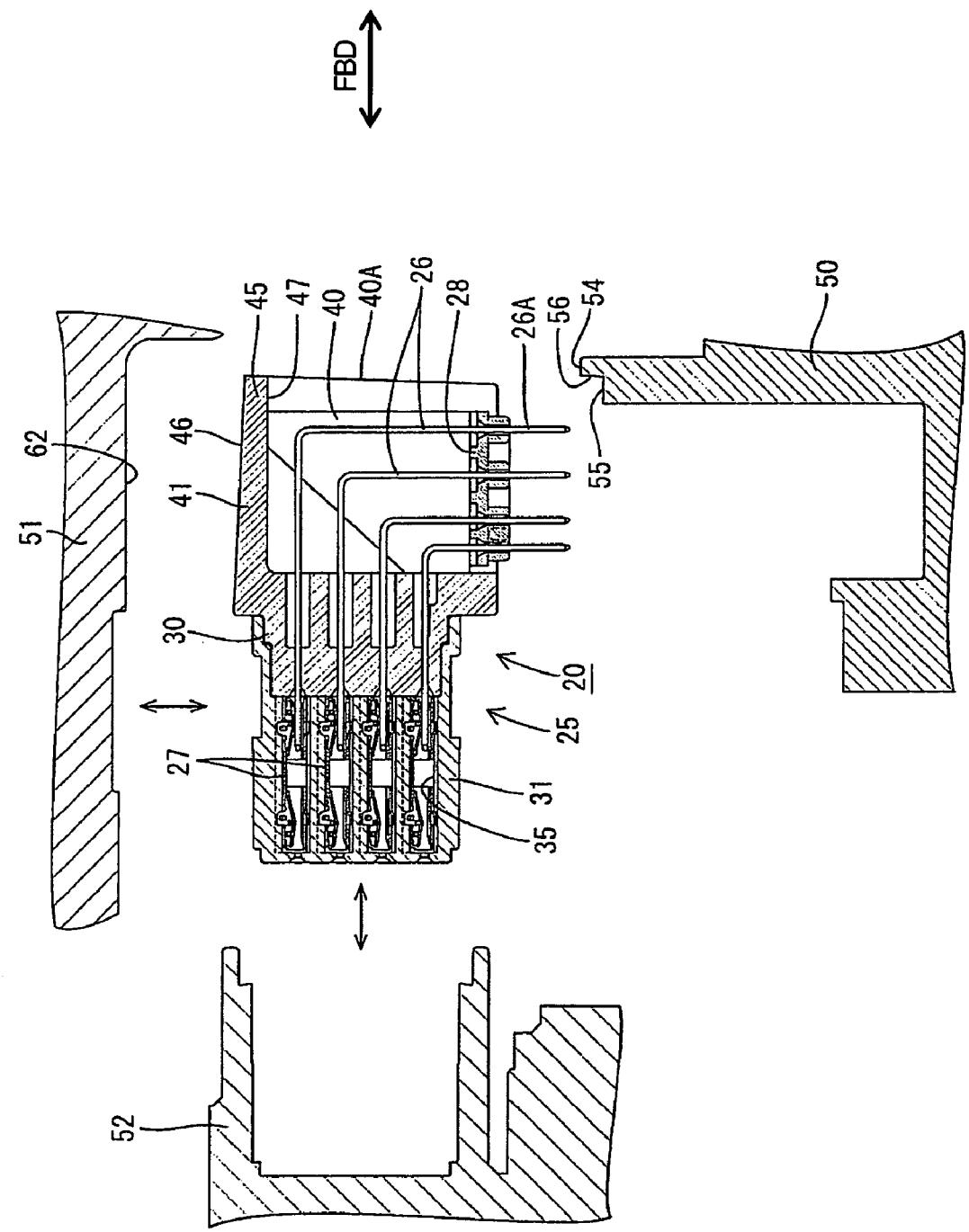
FIG. 3 is a section showing an arranged state of molding dies.

As shown in FIGS. 2 and 3, the connector 20 has a housing 25 made e.g. of synthetic resin. Terminal fittings 26, 27 are inserted in the housing 25, and an alignment plate 28 made of synthetic resin is mounted in the housing 25. The housing 25 has a main body 30 for accommodating the board terminals 26. A holder 31 is integral to the main body 31 and is adapted to accommodate the intermediate terminals 27.

The holder 31 projects out from the side wall 12 of the casing 11, and is surrounded by a tube 13 as part of the casing 11. A receptacle of the mating male connector can fit into a clearance between the holder 31 and the tube 13.

The main body 30 is substantially in the form of a block. Terminal insertion holes 33 penetrate the main body 30 in forward and backward directions FBD and the board terminals 26 are insertable the terminal insertion holes 33 from the front. Each board terminal 26 is formed from a long narrow member that is bent at a substantially right angle in an intermediate position to define a substantially L-shape. A rear part 26A of each board terminal 26 extends down in FIG. 3 and is inserted into a corresponding through hole in a device, such as a circuit board K, junction box, or similar appliance for connection with conductors or conductor paths on the circuit board K by soldering, welding, press-fitting or the like. On the other hand, front parts 26B of the board terminals 26 project from the front surface of the main body 30 and are insertable into cavities 35 in the holder 31.

The holder 31 also is substantially in the form of a block. A fitting tube 36 projects from the outer periphery of the rear end of the holder 31 is fit on and coupled to a front part of the main body 30. Cavities 35 are formed in the holder 31 in substantially the same arrangement as the board terminals 26. Intermediate terminals 27 are accommodated into the respective cavities 35 from behind, and insertion holes 38 are formed in the front wall for receiving terminals mounted in the mating male connector.

Each intermediate terminal 27 is formed by coupling at least two female connecting portions 27A one after the other to have a substantially symmetrical shape with respect to forward and backward directions FBD. Thus, the intermediate terminal fitting 27 can be accommodated in the cavity 35 from both front and rear sides.

Two side walls 40 cover the backward projecting parts of the respective board terminals 26 at opposite sides and extend back from near the substantially opposite lateral edges of the rear surface of the main body 30. Further, a base wall 41 covers the backward projecting parts of the respective board terminals 26 at a side opposite from the opening of the casing 11 and extend back from the bottom edge (upper edge in FIG. 4) of the rear surface of the main body 30, and connects the bottom ends of the opposite side walls 40. In this way, a space defined by the bottom wall 41 and the of side walls 40 is defined at the rear side of the main body 30, and this space serves or may serve as a terminal drawn-out part 43 for accommodating the backward projecting parts of the respective board terminals 26.

Reinforcing walls 44 are provided between the bottom wall 41 and the rear surface of the main body 30 in the terminal drawn-out part 43 for reinforcing the bottom wall 41 and for aligning the board terminals 26. The reinforcing walls 44 are substantially triangular beams when viewed sideways and are arranged substantially in the width direction to partition the respective terminal insertion holes 33.

The alignment plate 28 for aligning the board-side ends 26A of the respective board terminals 26 is mountable at the opening edges of the two side walls 40. The alignment plate 28 is formed with positioning holes 29 for receiving the board-side ends 26A of the board terminals 26.

Rear edges 40A of the side walls 40 are inclined back towards the upper end of FIG. 3 to facilitate removal of a molding die, and a rear end surface 45 of the bottom wall 41 is inclined to be substantially continuous and flush with the inclined rear edges 40A.

An outer surface 46 (upper surface in FIG. 4) of the base wall 41 is inclined moderately up from the rear towards the front. The rear edge of the outer surface 46 of the bottom wall 41 is at substantially the same height as a standing surface 56 of a lower die 50. Further, the outer surface 46 is recessed at the front edge thereof to be continuous with the outer surface of the main body 30.

Figure 4:
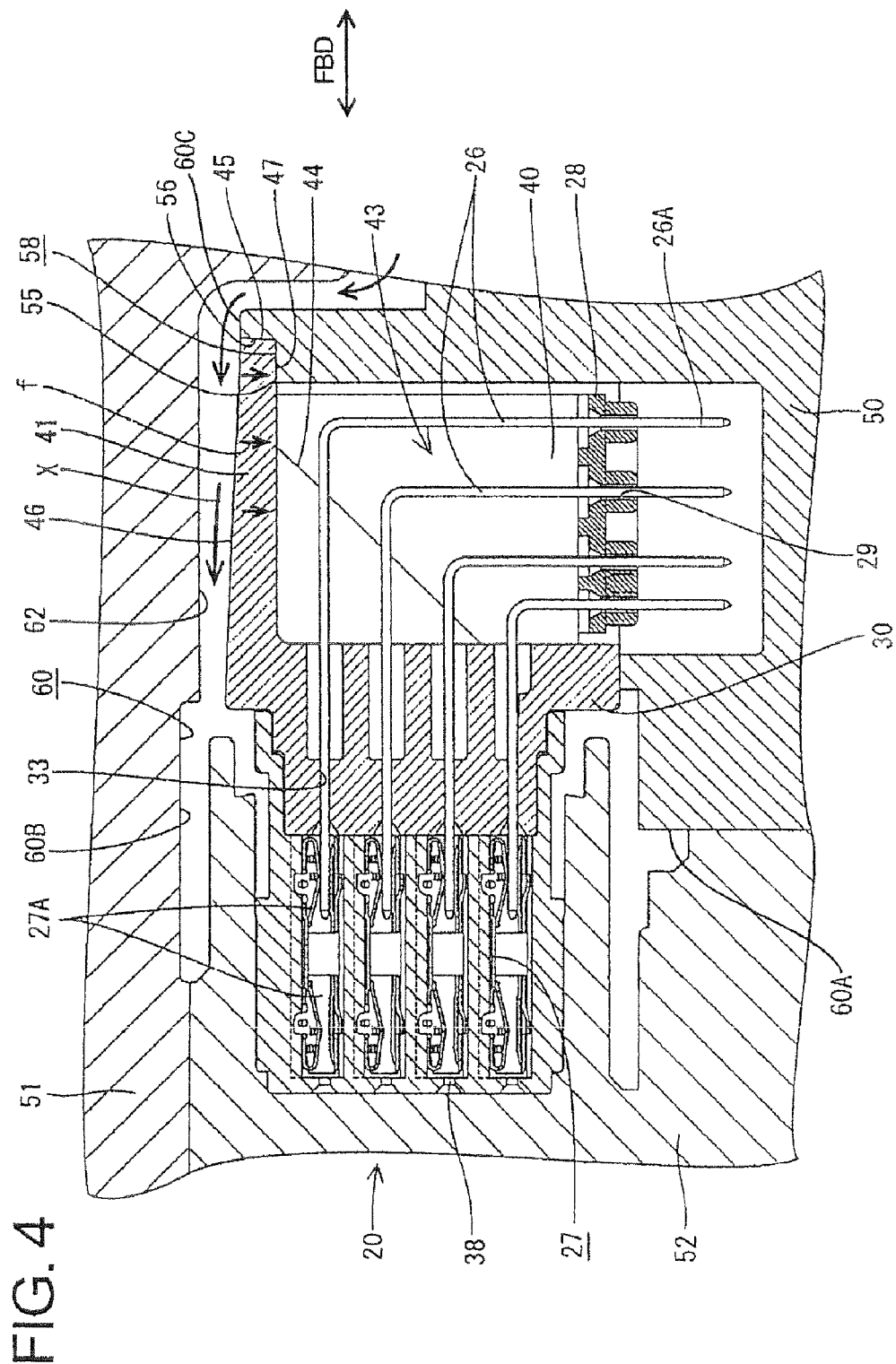
FIG. 4 is a section showing a state where the dies are closed with a connector placed as an insert.

The lower die 50 and an upper die 51 are opposed to each other and open and close along a vertical direction that is substantially normal to the forward and backward directions FBD. A sliding die 52 also is movable substantially normal to the opening and closing direction of the lower die 50 and the upper die 51 are for secondary molding as shown in FIGS. 3 and 4.

The lower die 50 is shaped to receive the connector 20 as an insert. Additionally, the lower die 50 is designed to receive the main body 30 of the housing 25 and to close the rear and upper sides (lower side in FIG. 4) of the terminal drawn-out portion 43 at the rear of the main body 30, as shown in FIG. 4. A highest surface 54 of the lower die 50 is recessed slightly at the front to form a recess 55, and an inner surface 47 of the rear end of the bottom wall 41 of the housing 25 and the inclined rear end surface 45 are placed in close contact with the recess 55 and the standing surface 56. This close-contact portion defines a cutoff portion 58.

The sliding die 52 is arranged before (left side in FIG. 3) the lower die 50 and can surround the holder 31 from the front of the main body 30. The sliding die 52 also functions to close the front surfaces of the cavities 35 in the holder 31. Further, a filling space 60A is defined between the sliding die 52 and the lower die 50 to form a part of the tube 13 in the casing 11.

The upper die 51 opposes the lower die 50 and the sliding die 52 from above and defines a filling space 60B between the sliding die 52 and the upper die 51 to mold the remaining part of the tube 13 of the casing 11. Further, a filling space 60C is defined between the upper die 51 and the lower die 50 as well as the bottom wall 41 of the connector 20 as an insert to mold a bottom plate 15 of the casing 11. The filling spaces 60A, 60B and 60C are identified collectively by the reference numeral 60 in FIGS. 4 and 5.

The ceiling of the filling space 60C between the lower surface 62 of the upper die 51 and the outer surface 46 of the bottom wall 41 of the connector 20 is substantially horizontal and substantially parallel to the forward and backward directions FBD. However, an outer surface 46 of the bottom wall 41 is inclined with a moderate upward inclination from the rear edge towards the front edge, as shown in FIG. 4. More particularly, the outer surface 46 of the bottom wall 41 and the lower surface 62 of the upper die 51 of the filling space 60C gradually converge, because the outer surface 46 of the bottom wall 41 defines an angle between about 1° and about 10° with respect to the forward and backward directions FBD, preferably an angle between about 1° and about 5°. Accordingly, the cross-sectional area of the filling space 60C is reduced gradually along a flowing path X of the molten resin into the filling space 60C.

The main body 30 and the holder 31 are assembled to form the circuit board connector 20 that is placed in the lower die 50 and the sliding die 52. At this time, as shown in FIG. 4, the opening of the terminal drawn-out part 43 of the circuit board connector 20 is closed by the lower die 50 and the inner surface 47 of the rear end of the bottom wall 41 of the housing 25 and the inclined rear end surface 45 are placed in close contact with the recess 55 and the standing surface 56 formed in the highest surface 54 of the lower die 50. Further, the filling space 60A is formed between the lower die 50 and the sliding die 52 for forming one part of the tube 13 of the casing 11.

The upper die 52 then is closed to define the filling space 60B for forming the remaining part of the tube 13 of the casing 11 between the lower surface 62 and the sliding die 52. Further, the filling space 60C for forming the bottom plate 15 of the casing 11 is formed between the upper die 51 and the lower die 50 as well as the bottom wall 41 of the connector 20 as an insert.

Figure 5:
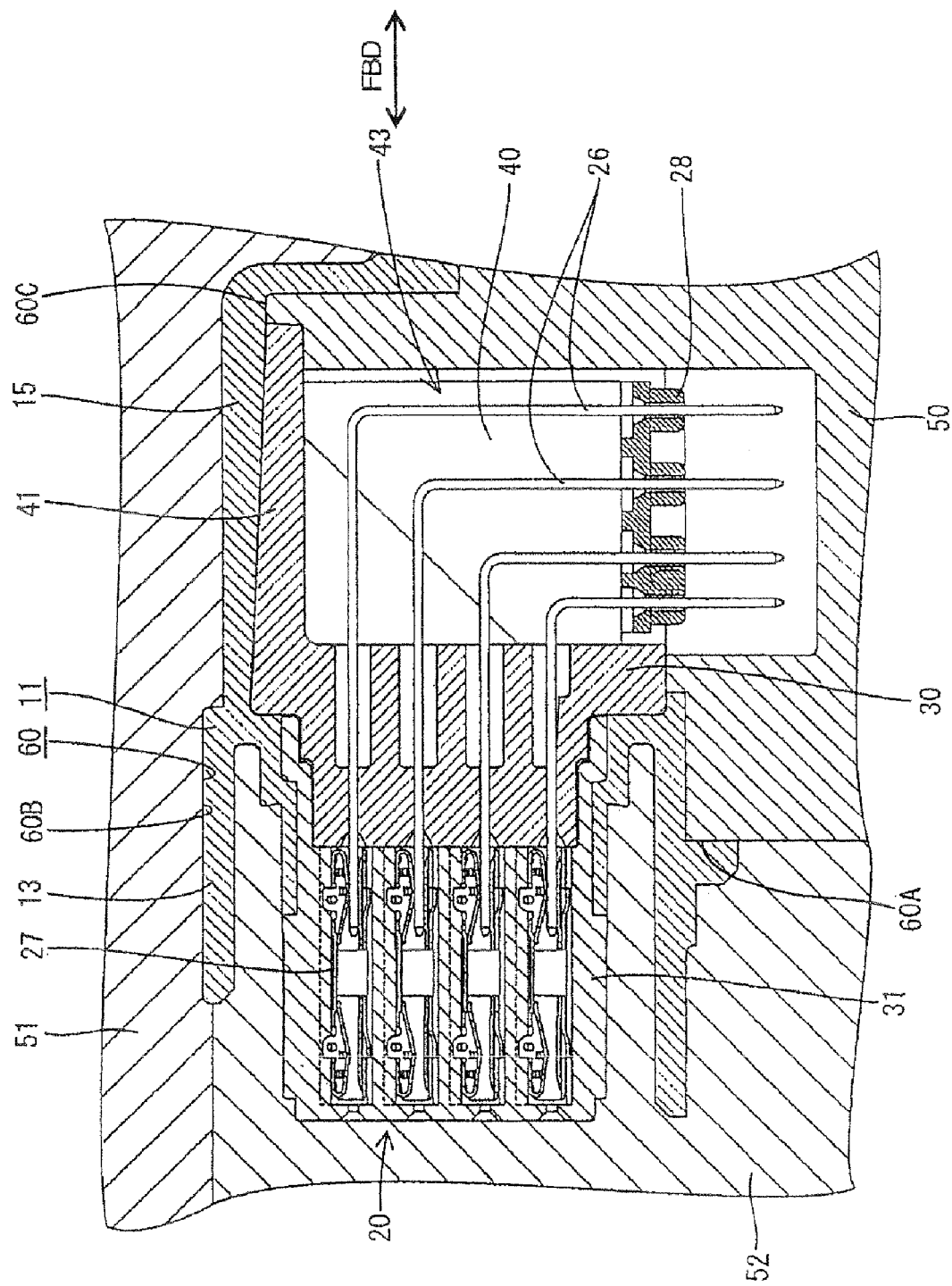
FIG. 5 is a section showing a solidified state of molten resin in filling spaces.

In this state, molten resin is filled into the filling spaces 60 between the respective molds 50, 51, 52 along the flow path X in FIG. 4, and solidifies to form the casing 11 as a secondary molded product as shown in FIG. 5.

The molten resin flows into the filling space 60C between the lower surface 62 of the upper die 51 and the outer surface 46 of the bottom wall 41 of the connector 20 from a side where the cutoff portion 58 is located. The outer surface 46 of the bottom wall 41 of the connector 20 facing the filling space 60C inclines up for gradually reducing cross-sectional area of the filling space 60C along the flowing path X. Thus, molten resin presses the outer surface 46, and the inner surface 47 of the bottom wall 41 of the connector 20 is urged against the recess 55 of the lower die 50 and is held strongly in close contact by a component "f" of the pressing force. Thus, the molten resin cannot intrude into the cutoff 58 or into the terminal draw-out part 43.

Figure 6:
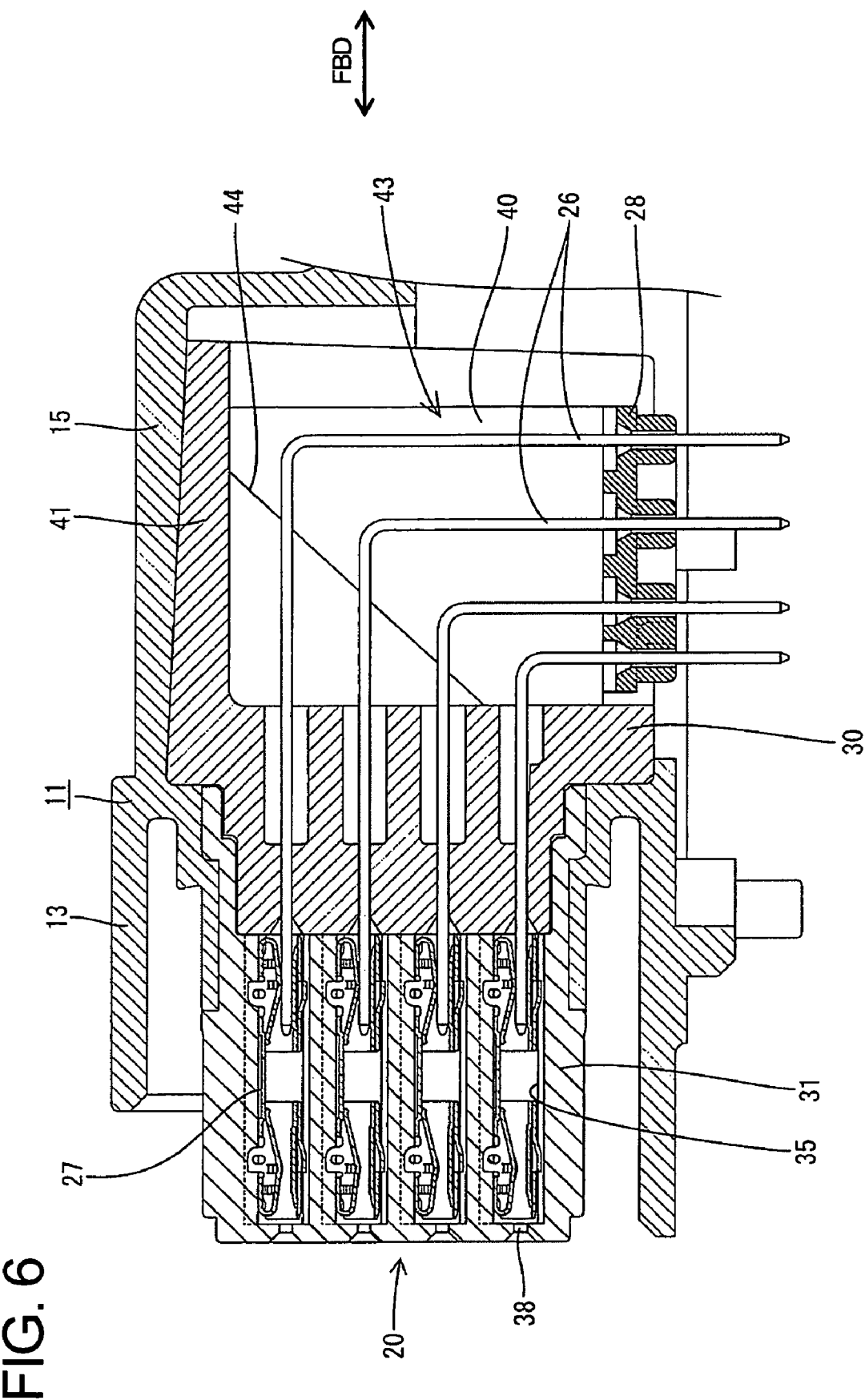
FIG. 6 is a section of the ECU taken out from the molding dies.
Figure 7:
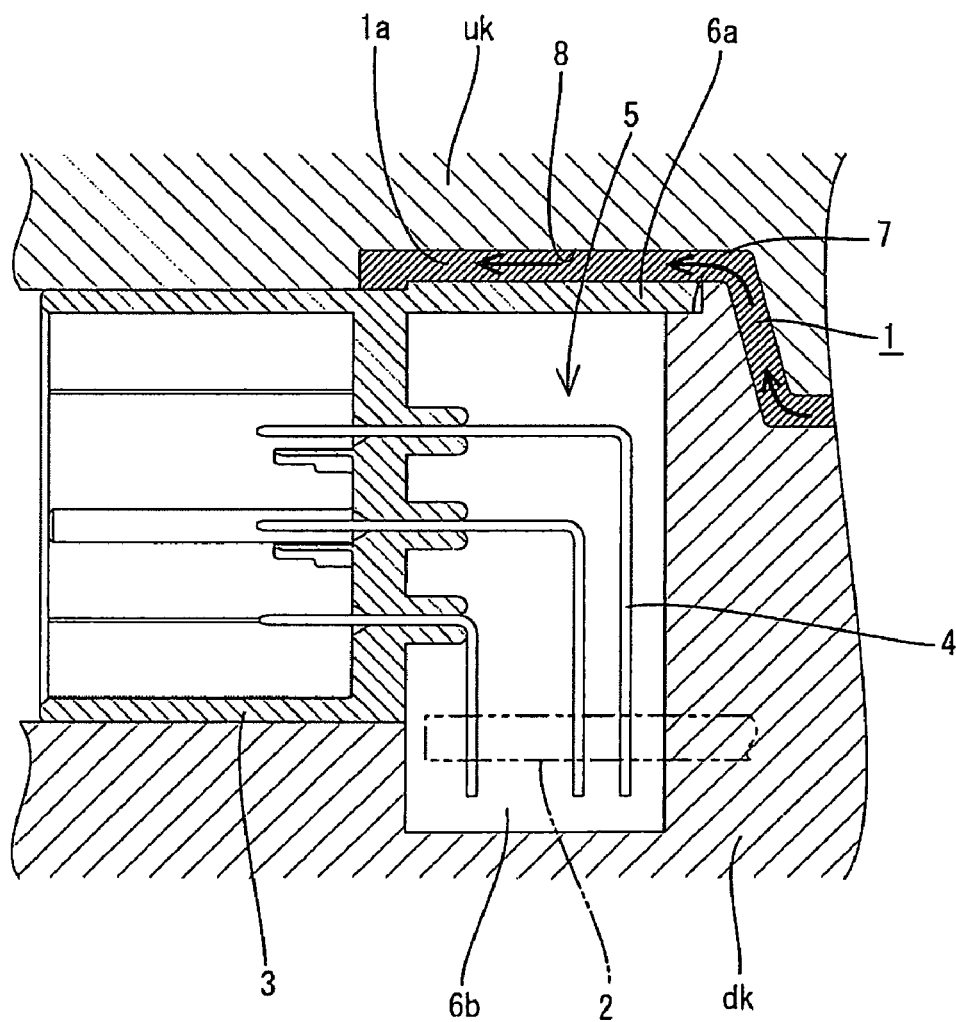
FIG. 7 is a section of a prior art.

The molds are opened, as shown in FIG. 6, after forming the casing 11 and the casing 11 is taken out. Then, as shown in FIG. 2, the board terminals 26 of the connector 20 are soldered to the circuit board K mounted to cover the opening of the casing 11. Further, a seal ring 17 is fit on the outer surface 46 of the connector 20 and retained by a ring pressing member 18 to complete the ECU 10.

As described above, the molten resin filling space 60C for forming the bottom plate portion 15 of the casing 11 is defined between the lower surface 62 of the upper die 51 and the outer surface 46 of the bottom wall 41 of the connector 20. The cutoff 58 is formed at a part where the rear edge of the bottom wall 41 is received by the lower die 50, and the outer surface 46 of the bottom wall 41 facing the filling space 60C is inclined to narrow the width of the filling space 60C gradually along the flowing path X of the molten resin.

Thus, the molten resin flowing into the filling space 60C presses the inclined outer surface 46 of the bottom wall 41, and the inner surface 47 of the bottom wall 41 is pressed against the recess 55 of the lower die 50 and strongly held in close contact by the component "f" of this pressing force. Thus, molten resin cannot intrude into the cutoff 58 or into the terminal draw-out part 43.

The invention is not limited to the above described embodiment, and the following embodiments also are embraced by the scope of the invention. Beside the following embodiments, various changes can be made without departing from the scope and spirit of the invention as defined by the claims.

The circuit board connector need not include intermediate terminals and the board terminals may be straight.

The invention is not limited to the ECU illustrated in the foregoing embodiment, and the invention is widely applicable to resin-molded products in general formed by insert molding using primary molded products as inserts.

The outer surface 46 of the bottom wall 41 is substantially flat and inclined in the illustrated embodiment. However, the cross-sectional area of the filling space 60C along the flow path X may be narrowed by curves or steps on the outer surface 46 of the bottom wall 41 and/or on the lower surface 62 of the upper die 51.

What is claimed is:

1. A molding construction for a resin-molded product, comprising:
    first and second molding dies openable and closable relative to each other along a moving direction, the first molding die having a surface facing the second molding die and a stepped recess in the surface of the first molding die, the stepped recess having a first recessed surface aligned substantially normal to the moving direction and facing the second molding die and a second recessed surface angularly aligned to the first recessed surface;
    an electrical connector defining an insert disposed in the first molding die, the electrical connector including a housing made of synthetic resin, the housing having a main body with a block-shaped portion having terminal insertion holes, terminals mounted in the terminal insertion holes and projecting rearward of the block-shaped portion, the housing further having two side walls projecting back from the block-shaped portion and a base wall projecting back from the block-shaped portion and joining the side walls so that a space is defined by the base wall and the side walls rearward of the block shaped portion, portions of the terminals projecting rearward of the block-shaped portion being in the space, the base wall having an inner surface facing into the space and held in close contact with the first recessed surface of the recess, the base wall further having an end surface facing away from the block shaped portion, the end surface of the base wall being held in close contact with the second recessed surface of the recess, the housing further comprising a holder having cavities aligned with terminals of the main body, intermediate terminals accommodated in the cavities and connected with the terminals in the main body;
    the second molding die having a surface facing a surface of the base wall of the insert while being spaced apart therefrom for defining a filling space upon closing the molding dies, a resin flow path into the filling space having an entry at a side where the recess is located, and a cross-sectional dimension of the filling space adjacent the base wall and measured perpendicular to the first recessed surface of the recess being reduced gradually along the resin flow path from a location aligned with the first recessed surface to a location along the flow path spaced from recess;
    a slide die movable substantially parallel to the first recessed surface of the recess in the first die and engaging the housing for urging the end surface of the base wall tightly against the second recessed surface of the recess;

wherein the gradually reduced cross-sectional dimension of the filling space along the flow path causes the molten resin to urge the base wall tightly against the first surface of the recess for preventing the molten resin from flowing into the space and adjacent to the terminals.

2. The molding construction of claim 1, wherein the base wall of insert substantially facing the filling space is inclined to narrow the width of the filling space gradually at farther distances from the entry.

3. The molding construction of claim 1 wherein the base wall has a thickness that increases gradually at farther distances from the recess.

4. A molding construction for a resin-molded product, comprising:

first and second molding dies openable and closable relative to each other along a moving direction, the first molding die having a surface facing the second molding die and a stepped recess in the surface of the first molding die, the stepped recess having a first recessed surface aligned substantially normal to the moving direction and facing the second molding die and a second recessed surface angularly aligned to the first recessed surface;

an electrical connector defining an insert disposed in the first molding die, the electrical connector including a housing made of synthetic resin, the housing having a main body with a block-shaped portion having terminal insertion holes, terminals mounted in the terminal insertion holes and projecting rearward of the block-shaped portion, the housing further having two side walls projecting back from the block-shaped portion, a base wall projecting back from the block-shaped portion and joining the side walls so that a space is defined by the base wall and the side walls rearward of the block shaped portion and at least one reinforcing wall extending between the base wall and the block-shaped portion, portions of the terminals projecting rearward of the block-shaped portion being in the space, the base wall having an inner surface facing into the space and held in close contact with the first recessed surface of the recess, the base wall further having an end surface facing away from the block shaped portion, the end surface of the base wall being held in close contact with the second recessed surface of the recess;

the second molding die having a surface facing a surface of the base wall of the insert while being spaced apart therefrom for defining a filling space upon closing the molding dies, a resin flow path into the filling space having an entry at a side where the recess is located, and a cross-sectional dimension of the filling space adjacent the base wall and measured perpendicular to the first recessed surface of the recess being reduced gradually along the resin flow path from a location aligned with the first recessed surface to a location along the flow path spaced from recess;

a slide die movable substantially parallel to the first recessed surface of the recess in the first die and engaging the housing for urging the end surface of the base wall tightly against the second recessed surface of the recess;

wherein the gradually reduced cross-sectional dimension of the filling space along the flow path causes the molten resin to urge the base wall tightly against the first surface of the recess for preventing the molten resin from flowing into the space and adjacent to the terminals.

5. The molding construction of claim 4, wherein the housing further comprises a holder having cavities aligned with terminals of the main body, intermediate terminals accommodated in the cavities and connected with the terminals in the main body.

6. The molding construction of claim 5, wherein the slide die is configured for closing the cavities of the holder.

7. The molding construction of claim 4, wherein the surface of the second molding die that faces the base wall is aligned substantially parallel to a direction in which the slide die is movable.

8. The molding construction of claim 4, wherein the base wall of insert substantially facing the filling space is inclined to narrow the width of the filling space gradually at farther distances from the entry.

9. The molding construction of claim 4 wherein the base wall has a thickness that increases gradually at farther distances from the recess.

10. The molding construction of claim 1, wherein the surface of the second molding die that faces the base wall is aligned substantially parallel to a direction in which the slide die is movable.

11. The molding construction of claim 1, wherein the slide die is configured for closing the cavities of the holder.

* * * * *